United States Patent [19]

Gernhardt et al.

[11] 4,059,475

[45] Nov. 22, 1977

[54] COMBINED MOUNTING AND PROJECTION APPARATUS FOR APERTURE CARDS

[75] Inventors: Wolfram Gernhardt, Tubingen; Gerhard Meier-Maletz, Wiesbaden-Biebrich; Heinz Zeutschel, Tubingen, all of Germany

[73] Assignee: Hoechst Aktiengesellschaft, Germany

[21] Appl. No.: 559,537

[22] Filed: Mar. 18, 1975

[30] Foreign Application Priority Data

Mar. 20, 1974 Germany ............................ 2413368

[51] Int. Cl.$^2$ ........................ B32B 31/00; B26D 7/00; G03B 21/00

[52] U.S. Cl. ...................................... 156/379; 83/521; 156/514; 156/518; 353/122

[58] Field of Search .......................... 353/122; 53/123; 83/521; 156/108, 514, 518, 379

[56] References Cited

U.S. PATENT DOCUMENTS

| | | | |
|---|---|---|---|
| 2,643,786 | 6/1953 | Baker | 83/521 X |
| 3,076,377 | 2/1963 | Brownscombe | 353/98 |
| 3,248,846 | 5/1966 | Engelstein | 53/123 |
| 3,872,645 | 3/1975 | Dorman | 53/123 |

*Primary Examiner*—Steven L. Stephan
*Attorney, Agent, or Firm*—James E. Bryan

[57] ABSTRACT

This invention relates to a mounting apparatus for aperture cards comprising cutting means for severing individual filmed images from a strip of film, said cutting means including a knife unit and a counter-knife unit, said knife unit being part of a plunger means which serves to simultaneously press the severed filmed image upon a mounting card, resilient counter-pressure frame means mounted opposite said plunger means, and projection means including a light source and a condenser lens, the latter being mounted in said plunger means.

3 Claims, 5 Drawing Figures

COMBINED MOUNTING AND PROJECTION APPARATUS FOR APERTURE CARDS

This invention relates to a combined mounting and projection apparatus for aperture cards comprising a cutting device for severing individual filmed images from a strip of film, which cutting device is composed of a knife unit and a counter-knife unit, the knife unit being designed as a plunger which simultaneously serves to press the severed filmed image upon the mounting card, and further comprising a projection device including a light source, a condenser, and a lens by means of which the filmed image is projected onto a screen.

Aperture card mounting apparatuses are used for automatically inserting film images into the apertures of mounting cards provided for this purpose. The mounting cards have a gummed layer along the rims of their apertures. In the mounting apparatus, the filmed image is first severed from a strip of film fed from a spool and then pressed, in the correct position, upon the adhesive rim surrounding the aperture of the mounting card, so that the filmed image fills the aperture in the mounting card.

Mounting apparatuses of this type have been known for some time. In German utility model No. 7,035,186, for example, an apparatus of this type is described in which the cutting device is composed of a knife and a counter-knife. The knife is in the form of a plunger and simultaneously serves as a device for pressing the severed image upon the card. The counter-knife of this apparatus is designed as a frame guide for the severed filmed image. On the other side of the mounting card, remote from the cutting device, a cushioned rim is embedded in the front wall of the apparatus, which serves as a counter-pressure frame when the plunger presses the severed image upon the gummed rim of the mounting card. At the end of the plunger remote from the filmed image, a light source is provided which illuminates the filmed image through the plunger. In this way, it is possible for the operator to observe the mounting process and to correct the position of the filmed image, if necessary, this being further facilitated by a magnifying glass which is provided in the front wall of the apparatus.

This apparatus has the disadvantage that the degree of enlargement achieved by the magnifying glass is not sufficient to enable the operator to read the filmed image. It would be of advantage, however, if the operator could compare the numbers appearing on the filmed image, for example those of numbered figures, with the numbers shown on the mounting card in order to make sure that the filmed images are inserted into the appropriate mounting cards.

Mounting apparatuses for aperture cards, i.e. the so-called Optical Mounters, are already known which comprise a device for projecting the filmed image onto a screen. With these apparatuses, it is possible for the operator to read the filmed image during the mounting process and thus control the insertion of the filmed images into the correct mounting cards.

In these apparatuses, the condenser lens is arranged within a metal counter-pressure frame. The filmed image is severed by means of a plunger which serves also for pressing the severed image onto the gummed rim of the mounting card. For this purpose, the plunger — which is made of metal and necessarily must have sharp edges since it serves as a cutting element — pushes against the counter-pressure frame and the condenser lens. As a result, the condenser lens is scratched and considerably damaged and even may be broken off. Apart from this susceptibility to trouble, the apparatus has the further disadvantage that, from the position of the operator, the screen is arranged relatively far back from the working surface, i.e. the area where the mounting cards are inserted into the apparatus and withdrawn from it and where the position of the filmed image is adjusted, if necessary. In addition thereto, the screen is arranged in such a manner that the plane of the screen and the working surface, where the actual mounting operation takes place, form an angle of more than 180° when seen from the position of the operator. Since he must observe both the working surface and the screen, it would be better for the operator if his direction of view would in each case form an angle of about 90° with the surface to be viewed. This, however, is impossible when the angle between the plane of the screen and the working surface is greater than 180°.

It is the object of the present invention to provide a combined mounting and projection apparatus for aperture cards which is less susceptible to trouble and in which, in particular, the condenser lens cannot be damaged during the mounting process.

This object is achieved by the aperture card mounting apparatus of the present invention comprising a cutting device for severing individual filmed images from a strip of film, which cutting device includes a knife unit and a counter-knife unit, the knife unit being designed as a plunger which simultaneously serves to press the severed filmed image upon the mounting card, and further comprising a projection device which includes a light source, a condenser, and a lens by means of which the filmed image is projected onto a screen. The aperture card mounting apparatus according to the invention has a condenser lens which is arranged in the interior of the plunger and an elastic counter-pressure frame for the plunger.

By arranging the condenser lens within the plunger and providing an elastic counter-pressure frame, scratching or other damaging of the condenser lens during pressing of the image onto the adhesive rim of the mounting card is avoided, because the marginal areas of the condenser lens forced against the counter-pressure frame abut against the elastic counter-pressure frame. The counter-pressure frame may be made of rubber or of foamed plastic material. Most advantageously, the elastic counter-pressure frame is embedded in the front plate of the apparatus.

Preferably, the condenser lens is arranged within that part of the plunger which faces the filmed image. Advantageously, the surface of the condenser lens facing the filmed image should be planar and coplanar with the plunger, so that the strip of film fed to the mounting area passes smoothly over the edge of the plunger without getting stuck.

In hitherto used aperture card mounting apparatuses, the filmed image positioned in the mounting area is held in a planar position at the plunger by means of laminated springs. One spring each is provided for the upper and lower edges of the filmed image, the springs being attached, for example, to the inside of the front plate of the apparatus and resting, under tension, against the edges of the filmed image. In the past, the laminated springs were arranged in such a manner that they were lifted from the filmed image by the rim of the aperture in the mounting card as soon as the mounting card was inserted into the apparatus, i.e. pushed between the front plate and the film. In this manner, the film leaves its planar position, which is disadvantageous not only for the mounting process itself, but also detracts from the sharpness and ready legibility of the image appearing on the screen. Therefore, it is a further object of the present invention to maintain the film in a planar position during the entire mounting process.

According to the present invention, this object is achieved by providing one or more pressing elements which reach through the aperture in the mounting card and maintain the filmed image in its planar position by pressing it against the plunger and the condens r lens if the latter is coplanar with the plunger. The pressing elements may be composed of two springs or wires which reach through the mounting card at the upper and lower rims of the aperture. They must be arranged at the rim so as to cover none of the information contained on the filmed image. The pressing elements may be arranged between the front plate and the counter-pressure frame embedded therein. Preferably, counter-pressure elements are used which are made of transparent, inwardly bent strips of film. In this case, the elements need not be arranged at the rim of the aperture and it is possible to use a film strip which extends substantially across the entire width of the aperture. The use of pressing elements made of plastic film has the further advantage that no damage to the surface of the filmed image is to be expected.

In order to have to set back the screen as little as possible from the working surface where the mounting cards are inserted into the apparatus and to incline the screen so that it can be easily viewed by the operator, the projection device possesses the following characteristic features. The light source is arranged either within or behind the portion of the plunger remote from the filmed image, so that the rays pass through the plunger before transilluminating the filmed image. Further, at least two deflecting mirrors are arranged in the path of rays between the filmed image and the screen, one of them between the filmed image and the lens. By the second mirror, the rays arriving from the lens are directed onto the screen. Preferably, however, the rays arriving from the lens are directed onto the screen by means of two mirrors.

According to another embodiment of the inventive apparatus, a deflecting mirror is arranged within or behind the portion of the plunger remote from the filmed image, the rays emitted by the light source being deviated to the plunger by this mirror. The further path of the rays corresponds to the above-described path.

The invention will now be described more in detail by reference to the accompanying drawings, in which.

Figure 1:
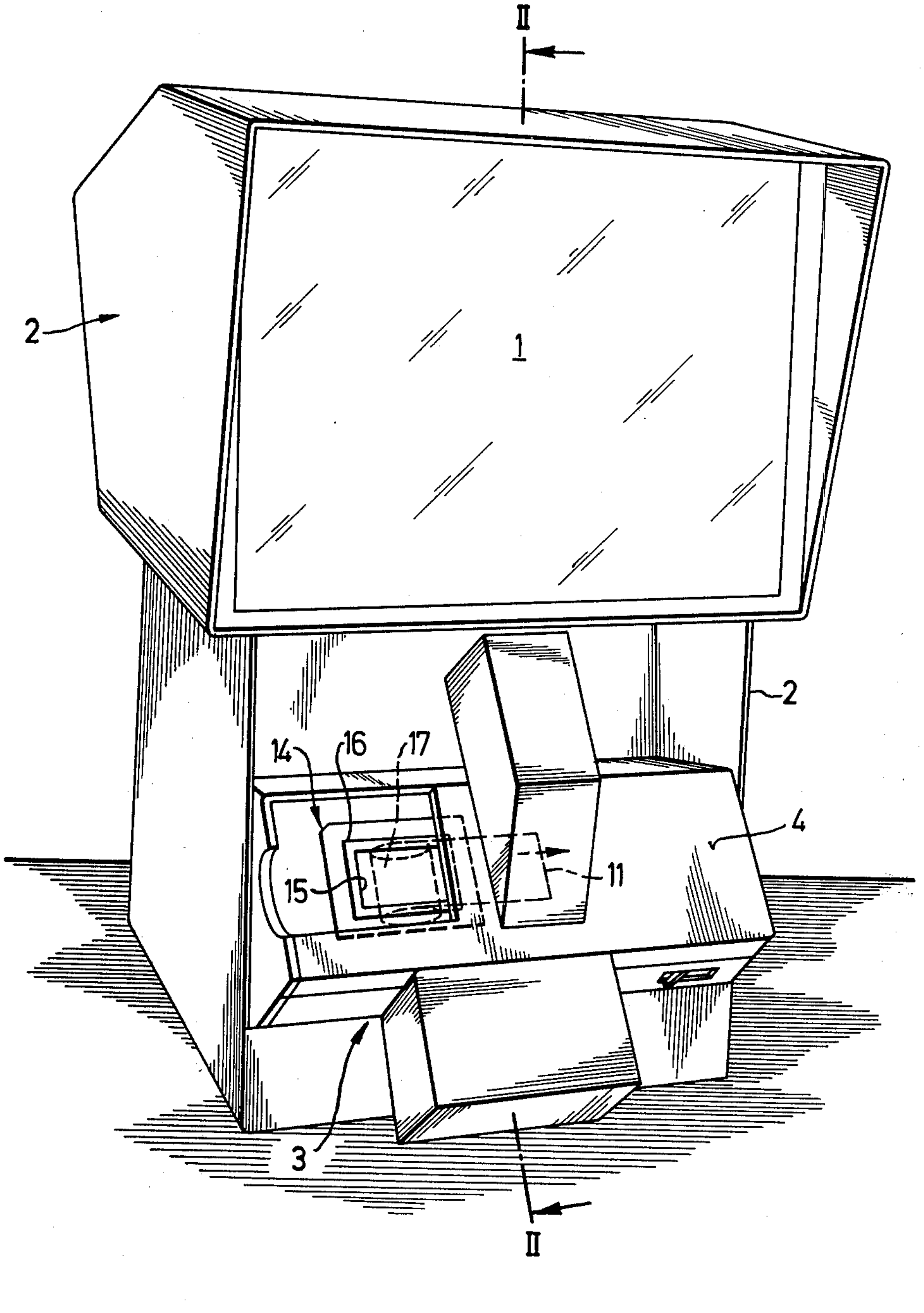
FIG. 1 is a perspective view of the exterior of the apparatus.
Figure 2:
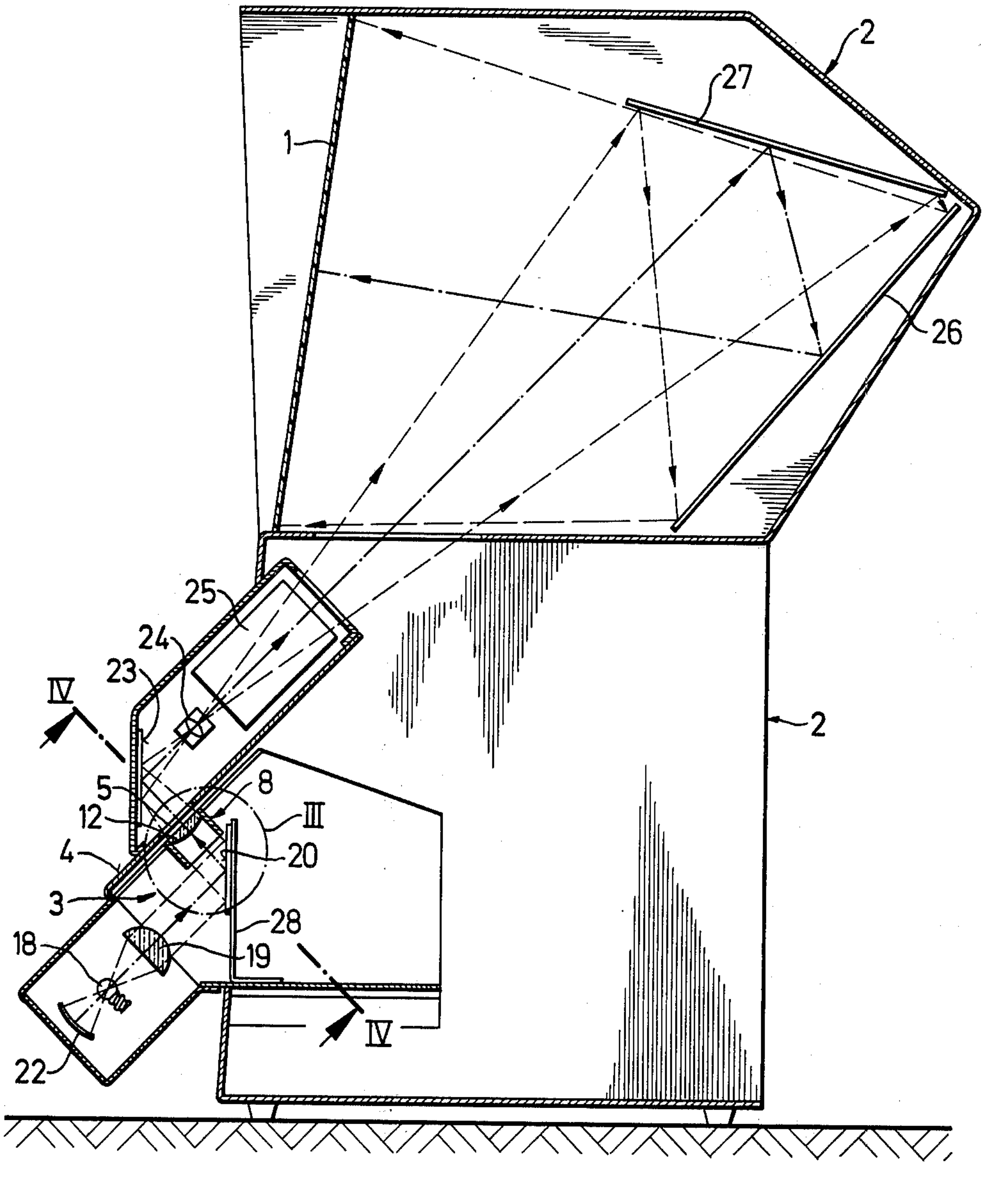
FIG. 2 is a cross-section from the front to the rear of the apparatus, along line II—II of FIG. 1.
Figure 2A:
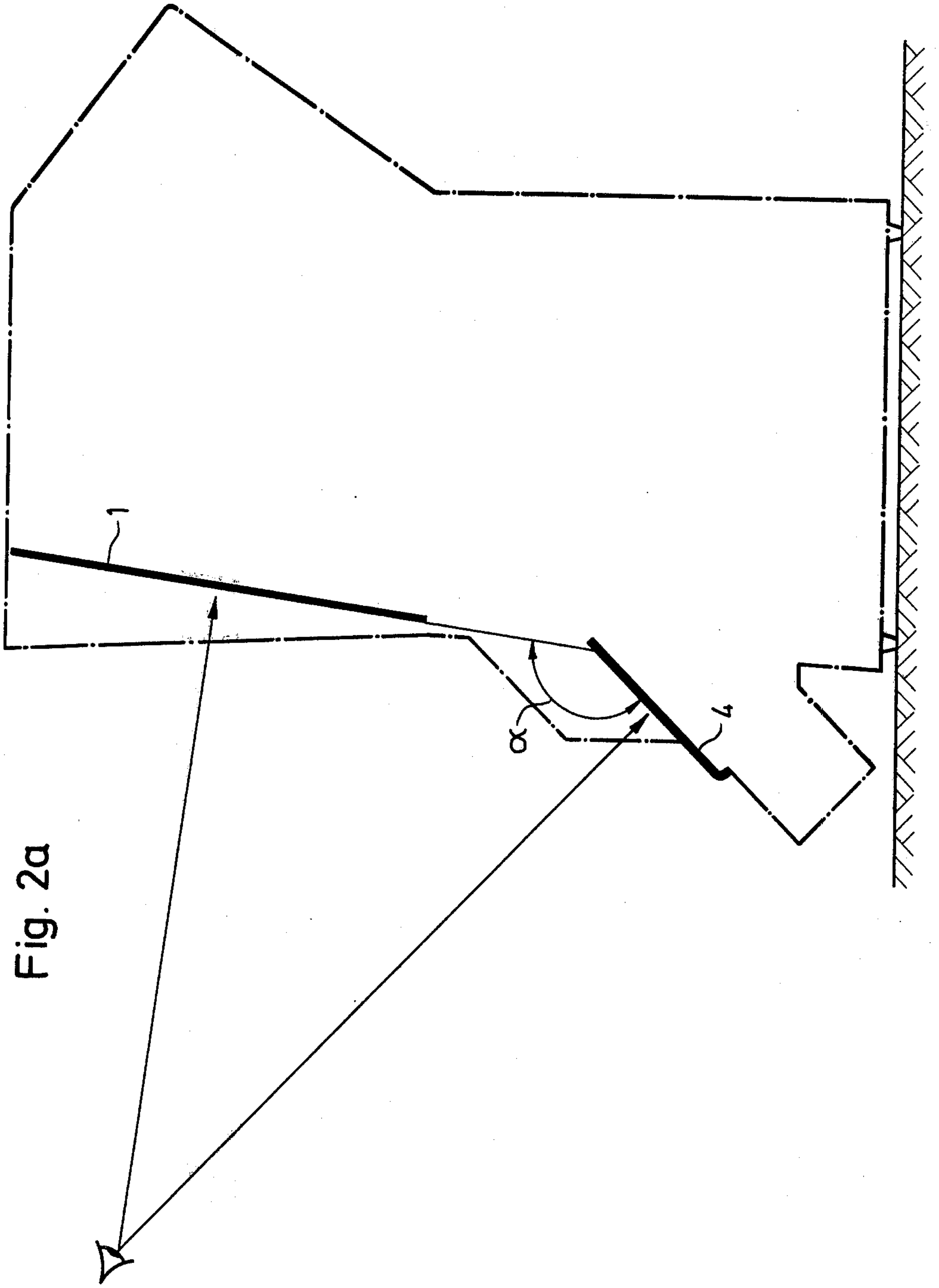
FIG. 2*a* shows the angle between the plane of the screen and the front plate.

The screen 1 is arranged in the upper portion of the housing 2. The mounting station 3 is below the screen 1. The front plate 4 of the mounting section 3 is provided with a window opening 5 (see FIGS. 3 and 4). On the inside of the front plate 4, the window opening 5 is surrounded by a frame-shaped groove which is filled with a resilient material, thus forming an elastic counter-pressure frame 6. The mounting card 14 is inserted between the front plate 4, i.e. the counter-pressure frame 6 inserted therein, and the counter-knife unit 7. In FIG. 4, the mounting card 14 and the film 11 are shown in the position which they assume shortly before they are inserted into the mounting area proper. The counter-knife unit 7 is composed of two lateral sharp-edged bars. When a filmed image is to be severed from the film 11, the plunger 8 is moved in the direction of the window opening 5 and engages these bars with the two cutting bars 7'. The plunger 8 is reciprocated in the guide rails 8' by means of the side bars 31, an eccentric shaft 9, and the connecting rod 10. The film 11 is introduced into the mounting area between the counter-knife unit 7 and the plunger 8. In the front part of the plunger 8 which faces the filmed image 11, a condenser lens 12 is mounted. The surface of the lens facing the filmed image 11 is planar and flush with the rim of the plunger. Between the counter-pressure frame 6 and the front plate 4, a transparent, inwardly curved strip of film 13 is provided which extends substantially over the entire width of the window 5. As can be seen from FIG. 4, the film strip 13 reaches through the aperture 15 in the mounting card 14 positioned in the mounting area and rests against the filmed image 11 under tension. In this manner, the filmed image 11 is pressed against the plunger 8 and the condenser lens 12 mounted therein and is forced into a planar position.

Figure 3:
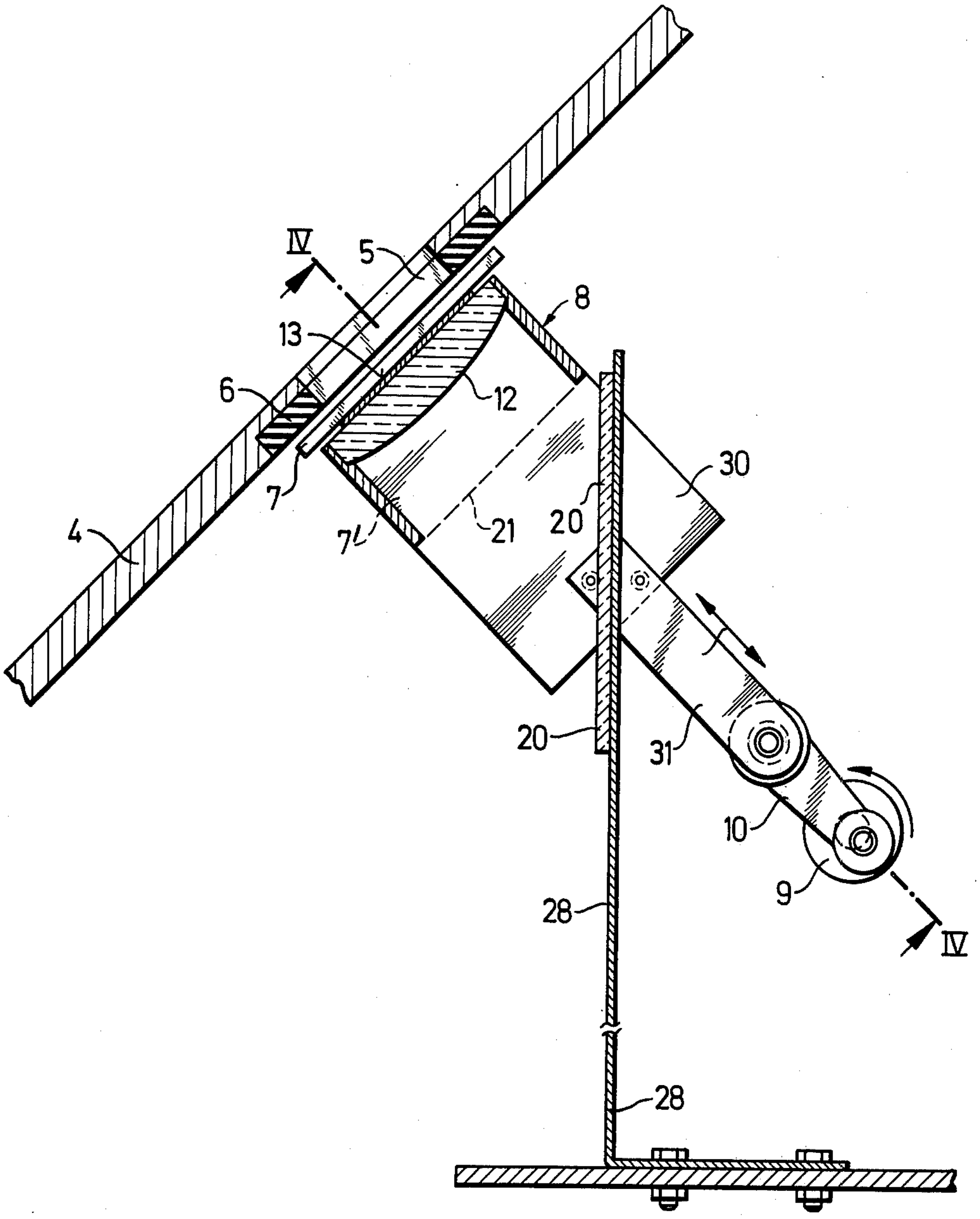
FIG. 3 is an enlarged cross-section of the detail indicated in FIG. 2 by a circle III.
Figure 4:
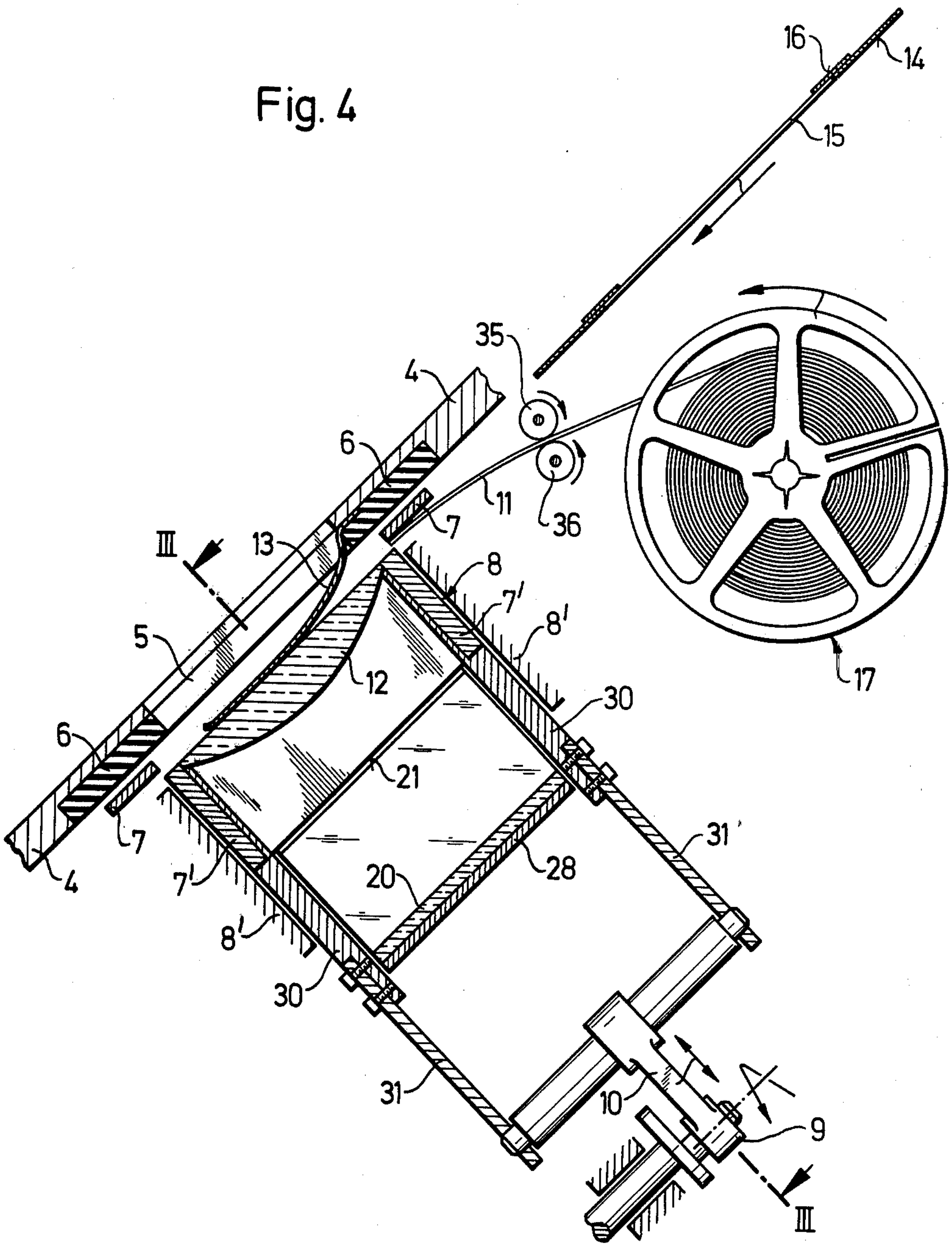
FIG. 4 is a section through FIG. 3 along the line IV—IV.

In FIGS. 3 and 4, the plunger 8 is shown in the idle position; it is withdrawn a short distance from the front plate 4. When the apparatus is operated, the plunger 8 is advanced in the direction of the front plate 4 by means of the eccentric shaft 9 and the connecting rod 10. As soon as the plunger 8 engages the counter-knife unit 7, the filmed image positioned between this unit and the plunger is severed. While the plunger 8 continues its movement in the direction of the front plate 4, it presses the severed filmed image 11 against the gummed rim 16 of the aperture 15 in the mounting card 14. Counter-pressure is exerted by the elastically deformable counter-pressure frame 6. In this manner, the filmed image 11 is firmly attached to the gummed rim 16 of the mounting card 14. Subsequently, the plunger 8 is retracted into the position shown in FIGS. 3 and 4. As the last operation the film is reeled from the film spool 17 and fed to the mounting area, e.g. over the guide rolls 35 and 36, so that the following filmed image 11 is positioned in the mounting area, i.e. between the counter-knife unit 7 and the plunger 8, when the next operation begins.

In the following, the projection device and the path of rays therein will be explained. The light emitted by the lamp 18 passes through a second condenser lens 19 and is deflected by the mirror 20 into the plunger 8. The mirror 20 is arranged in the rear portion of the plunger 8, away from the filmed image 11. Contrary to the front portion of the plunger 8, which is in the form of a frame, the rear portion is composed only of two side walls, i.e. the upper and lower surfaces of the plunger 8 are open. Up to the line 21, the plunger forms a frame with four boundary surfaces, but only the lateral surfaces 30 extend into the rear portion, so that the mirror 20 may project above and below the lateral surfaces 30. A reflector 22 is arranged behind the lamp 18. The rays deflected by the mirror 20 pass through the plunger 8 and the first condenser lens 12 therein and then pass through the filmed image 11 positioned in the mounting area. In FIG. 4 the filmed image 11 has not yet been inserted. After passing the filmed image 11 and the window opening 5 in the font plate 4, the rays impinge upon a deflecting mirror 23 arranged on the inside of the front plate 4. By this mirror, the rays are deflected to the lens 24. An inverting prism 25 is mounted in the path of rays behind the lens. In the upper portion of the housing, two deflecting mirrors 26 and 27 are arranged by means of which the image is projected upon the screen 1.

Thus, in the mounting area, the rays are first deflected in the direction of the operator, and then redirected, by the deflecting mirror 23, away from the operator. This path of rays has the advantage that the screen 1 need not be excessively set back with respect to the front plate 4 where the mounting cards 14 are introduced, so that the information on the filmed image, which is reproduced on the screen, may be read more easily. Moreover, the plane of the screen and the front plate 4 form an angle $\alpha$ of less than 180°, which also facilitates reading by the operator (see FIG. *2a*).

Alternatively, the light source 18, the reflector 22, and the condenser lens 19 may be arranged on a rear extension of the line defined by the rays passing througn the plunger 8, i.e. behind the deflecting mirror 20 held in a mounting 28. In this case, however, the deflecting mirror 20 is not necessary, and the light emitted by the light source 18 is directly projected in the direction of the plunger 8 and the filmed image 11.

As can be seen from FIG. 4, the mounting card 14 carries a gummed rim 16, part of which is attached to the card, whereas another portion of the adhesive side projects over the aperture 15 of the mounting card. The gummed rim preferably consists of an adhesive tape.

It will be obvious to those skilled in the art that many modifications may be made within the scope of the present invention without departing from the spirit thereof, and the invention includes all such modifications.

What is claimed is:

1. A mounting apparatus for aperture cards comprising cutting means for severing individual filmed images from a strip of film, said cutting means including a knife unit and a counter-knife unit, said knife unit being part of a plunger means having an edge facing the filmed image, and said plunger means serving to first sever and then to press the severed filmed image upon a mounting card, resilient counter-pressure frame means mounted opposite said plunger means, projection means including a light source, a condenser lens and an objective lens, forming an optical path, an opening in said plunger means positioned in said path, said condenser lens having a flat surface and being mounted in a portion of the plunger means facing the filmed image, the edge of the plunger means facing the filmed image being flush with said flat surface of said condenser lens, whereby said flat surface and said edge of said plunger together form a pressing means for the filmed image.

2. An apparatus according to claim 1 including a front plate having resilient pressing means directed toward said plunger means, said resilient pressing means having a pressing face, which pressing face is smaller than an opening of said mounting card, whereby said pressing face extends through the opening of said mounting card and presses the filmed image against said plunger means during the mounting process.

3. An apparatus according to claim 2 in which said pressing means are transparent, inwardly curved strips of film which bear against a filmed image under tension resulting from said curvature.

* * * * *